United States Patent
Djordjevic

(10) Patent No.: US 7,193,209 B2
(45) Date of Patent: Mar. 20, 2007

(54) METHOD FOR DISTINGUISHING OBJECTS IN A VIDEO IMAGE BY USING INFRARED REFLECTIVE MATERIAL

(75) Inventor: Miomir B. Djordjevic, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 30 days.

(21) Appl. No.: 10/417,643

(22) Filed: Apr. 17, 2003

(65) Prior Publication Data

US 2004/0206904 A1 Oct. 21, 2004

(51) Int. Cl.
*G01J 5/00* (2006.01)

(52) U.S. Cl. ................................. 250/330

(58) Field of Classification Search ............ 250/330, 250/332
See application file for complete search history.

(56) References Cited

U.S. PATENT DOCUMENTS

| | | | |
|---|---|---|---|
| 3,225,177 A | 12/1965 | Stites et al. | |
| 3,563,771 A | 2/1971 | Tung | |
| 4,367,919 A | 1/1983 | Tung et al. | |
| 4,605,232 A * | 8/1986 | Hundstad | 273/348.1 |
| 5,771,099 A | 6/1998 | Ehbets | |
| RE36,899 E | 10/2000 | Shetty et al. | |
| 6,174,360 B1 | 1/2001 | Sliwinski et al. | |
| 6,235,106 B1 | 5/2001 | Loucka et al. | |
| 6,465,787 B1 * | 10/2002 | Coulter et al. | 250/341.3 |
| 6,493,620 B2 * | 12/2002 | Zhang | 701/45 |
| 6,677,042 B2 * | 1/2004 | Kuntz et al. | 428/402 |
| 2001/0009725 A1 | 7/2001 | Moriyama et al. | |
| 2001/0022151 A1 | 9/2001 | Sliwinski et al. | |

* cited by examiner

*Primary Examiner*—Constantine Hannaher
(74) *Attorney, Agent, or Firm*—Quarles & Brady; George E. Haas

(57) ABSTRACT

A motor vehicle has a video system that analyzes images of the interior of the vehicle to detect certain characteristics for controlling functions of the vehicle, such as detecting the presence of a person on the seat to control deployment of air bags in the event of a crash. The system employs infrared light to illuminate the vehicle interior without affecting the driver's ability to see the highway. In order to distinguish different objects in the image which have similar colors, such as a person dressed in black sitting on a black seat, a selected object, such as the seat, are coated with a substance that alters the object's reflectivity to infrared light, while not changing the reflectivity to visible light. Thus analysis of the infrared image can distinguish between the objects without affecting the appearance of the vehicle interior to a human user.

14 Claims, 1 Drawing Sheet

METHOD FOR DISTINGUISHING OBJECTS IN A VIDEO IMAGE BY USING INFRARED REFLECTIVE MATERIAL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to optical object detection systems which produce and analyze an electronic image, such as systems used to detect the presence of an occupant in a motor vehicle; and more particularly to techniques for distinguishing between different objects which have similar colors in the image.

2. Description of the Related Art

Modern motor vehicles incorporate an air bag inside the dashboard facing a passenger in the front seat. Additional air bags are being proposed for the doors to the sides of the front seat occupants. Rapid deceleration of the motor vehicle during an accident is detected and activates inflation of the air bags which then cushion the occupants. Although air bags have greatly decreased the severity of injuries from motor vehicle collisions, people are occasionally injured due to the rapid rate at which the air bag must deploy. In particular, the air bag may severely injure a small child or infant sitting in the front seat of the motor vehicle. Relatively small adults also are susceptible to injury.

As a consequence, it is now recommended that small children and infants ride in the rear seat of the motor vehicle, so as not to be exposed to the force of air bag deployment in the event of an accident. However, that does not address the situation which occurs when this recommendation is ignored and a child rides in the front seat. Furthermore, in vehicles that do not have a rear seat, such as sports cars and trucks, a child or infant must be placed in a seat that faces an air bag. In this latter situation, it has been proposed to provide an override switch to disable the air bag in front of the child. However, this approach requires that this switch be manually operated whenever a child is present and then reset to activate the air bag for adult passengers. Forgetting to appropriately set the switch for the passenger can result in dire consequences during an accident. Thus it is desirable to provide a system for automatically controlling the operation of an air bag based on the type of person in the vehicle seat.

In response to that desire, an optical system was developed that produced an electronic image of the seating area in the motor vehicle and analyzed that image to detect the presence and size of an occupant. U.S. Pat. No. 6,493,620 describes such a motor vehicle occupant detection system. These systems often use a monochromatic, solid state imager which generates a black and white image of the seating area. In order for an image to be produced at night, artificial illumination must be provided which does not interfere with the driver's ability to observe the highway. One solution illuminates the vehicle interior with near infrared (NIR) light, while an image is being acquired. Near infrared light is invisible to the human eye, yet can be detected by a solid state imager.

However, when a person dressed in black sits on a black seat, the ability of the black and white image analysis to recognize contours of that person was dramatically reduced which adversely affected determining the size of the person for airbag control. A very high percentage of clothing worn by adults and adolescences is black. Thus, the inability of the image analysis to properly distinguish the outline of a person from the black seat presents a significant limitation to the reliability of the occupant detection system.

SUMMARY OF THE INVENTION

In order to enable a video image processing system in a motor vehicle to distinguish between adjacent objects having similar colors, one of the objects being imaged is coated with a substance that increases the object's reflectivity to infrared radiation. Preferably that substance does not substantially alter reflectivity of the object to visible light, so that the object's appearance to a human eye will not be alerted significantly.

One category of substances that can be applied to the objects to change the infrared radiation reflectivity comprise pigments in a carrier. For example, to distinguish among black objects a black pigment that is highly reflective to infrared light can be mixed with a carrier selected from the group consisting of vinyl printing ink, acrylic lacquer, polyurethane, and polyurethane lacquer to produce a solution for application to the object. This substance makes the object appear very shiny, thus having a gray appearance in an infrared image.

As an alternative approach, a solution of glass beads in a carrier, such as an acrylic lacquer and an acrylate dissolved in chloroform, can be applied to the object. As an option, the glass beads can be coated with a reflective metal. The glass beads similarly alter the reflectivity of the object to infrared radiation thus changing its appearance in the electronic image and distinguishing the object from other objects having a similar color in visible light.

DETAILED DESCRIPTION OF THE INVENTION

Figure 1:
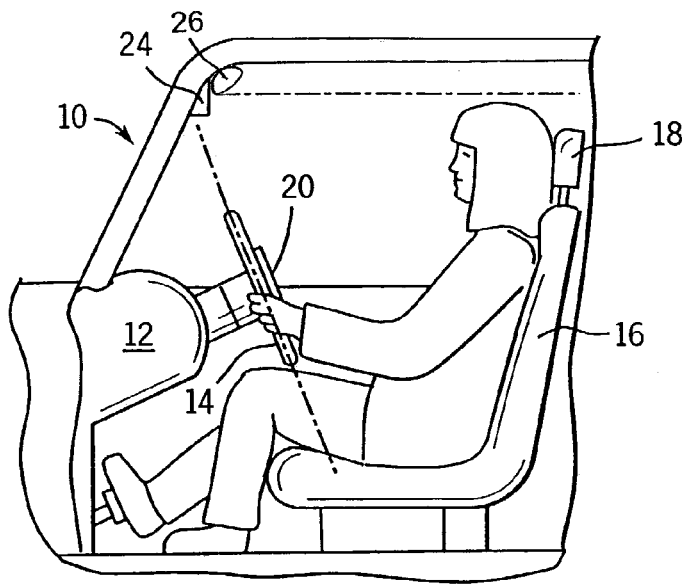
FIG. 1 is a side view of a motor vehicle incorporating an occupant detection system according to the present invention.

With reference to FIG. 1, the front portion of the passenger compartment of an automobile 10 includes a dashboard 12 from which a steering wheel 14 projects. A front seat 16 is spaced from the dashboard 12 and includes standard headrests 18 for the passenger and driver. The steering wheel 14 has a central compartment which houses an air bag 20 and the dashboard 12 has another compartment (not visible) which contains a second air bag located forward of the right portion of the front seat 16.

Figure 2:
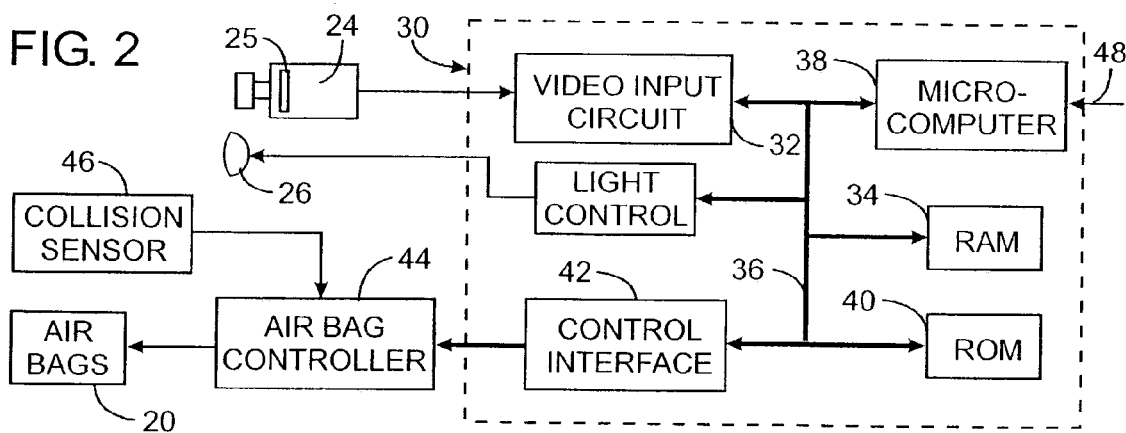
FIG. 2 is a block schematic diagram of an exemplary system for classifying objects within a motor vehicle.

Mounted above the windshield in the ceiling of the passenger compartment is a video camera 24 that preferably utilizes a solid state CMOS imager 25, see also FIG. 2. The imager 25 is responsive to near infrared (NIR) light produced by one or more sources 26 mounted adjacent the camera to illuminate the front seat 16 of the motor vehicle. The sources 26 produce radiation in the 850–910 nm range which is invisible to the human eye. Such illumination allows operation of the occupant detection system 10 at night without affecting an occupant's ability to see the highway. In addition the illumination from source 26 fills in image shadows during daytime operation.

With reference to FIG. 2, the images produced by the video camera 24 are applied to a video input circuit 32 of an image processor 30. Each video image consists of a two-dimensional array of picture elements (pixels). The video input circuit 32 controls storage of the pixels in a random access memory (RAM) 34 with both devices being connected to a set of signal buses 36. The RAM 34 also stores variable values, intermediate data, and final results of the image analysis. Analysis of the acquired electronic images is controlled by a microcomputer 38 which executes a program stored in a read only memory (ROM) 40. For example, the image may be processed by the technique described in U.S. Pat. No. 6,493,620. The microcomputer 38 also operates a light control circuit 45 which activates the near infrared (NIR) light source 26 while an image is being acquired from the video camera 24.

A control interface circuit 42 also is connected to the set of signal buses 36 and interfaces the image processor 30 to other components in the motor vehicle 10. In the exemplary system, the image analysis controls operation of the air bag 20 and the control interface circuit 42 is connected to the air bag controller 44 of the vehicle. The air bag controller 44 also receives a signal from a conventional collision sensor 46 when an accident occurs. The air bag controller 44 responds to these inputs by activating the driver and passenger air bags 20.

The image processing to determine the presence of an person on the vehicle seat 16 and the size of that person requires the ability to distinguish between an empty black seat and a person dressed in black on that seat. That distinction can be accomplished by coating the seat with a substance that has different reflective properties to near infrared light than conventional vehicle upholstery without significantly affecting the appearance of the coated object to the human eye, i.e. the object's reflectivity of visible light. One approach is to apply pigment to the black seat which is highly reflective to near infrared radiation or at least more reflective that untreated seat material. Therefore the seat will appear lighter in color to the CMOS imager which is responsive to the near infrared radiation. Pigments suitable for this application include "Black 411" sold by The Shepherd Color Company of Cincinnati, Ohio and "Meteor Plus 9895 High IR Black" available from the Engelhard Corp. of Iselin, N.J.

For application to the seat, the pigments can be dispersed in numerous commercially available fast curing carriers, such as Nazdar GV 170 vinyl coating sold by Nazdar Company, Inc., Chicago, Ill., USA; Duracryl DCA 468 Acrylic Lacquer sold by PPG Industries, Strongville, Ohio, USA; Minwax Ultra Fast Drying Polycrylic Protective Finish and Acrylic Lacquer or Minwax Fast Drying Polyurethane, a polyurethane lacquer, both sold by the Minwax Company, Upper Saddle River, N.J., USA. It appears that the relative brightness of the resultant seat treated with this reflective substance does not depend significantly on the concentration of the pigment within the carrier. Relatively small differences in resultant brightness of the seat were observed between a solution in which the pigment to carrier ratio was 25:100 as compared to another solution having a 50:100 ratio.

Black vinyl upholstery treated with this pigment substance generated a relative brightness which was greater than a standard gray card reference available from the Eastman Kodak Company of Rochester, N.Y., USA. The treated sections of black vinyl material appear significantly different in an image produced by the CMOS imager than untreated sections and other untreated black objects, such as clothing worn by vehicle occupants. Therefore by treating the upholstery material for the front seat with one of these pigment substances, the seat appears significantly different in the electronic image than a person wearing black clothing.

Figure 3:
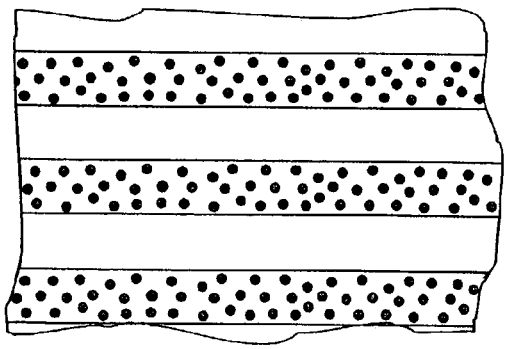
FIGS. 3 and 4 illustrate sections of upholstery in a motor vehicle treated in two different patterns with a substance according to the present invention.
Figure 4:
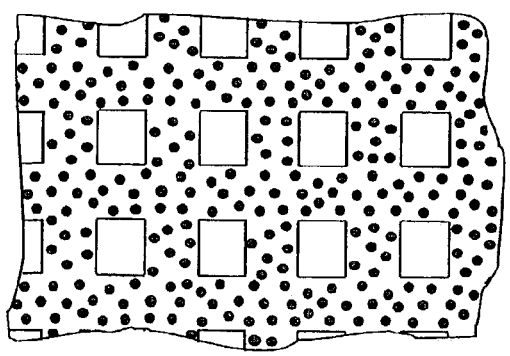

In order to distinguish between the seat treated with this pigment and a person wearing a gray top that appears similarly bright to the imager, the pigment substance can be applied to the vehicle seat in a pattern so that the seat has areas of treated and untreated upholstery. For example as shown in FIG. 3, a pattern of horizontal extending stripes provides one set of areas where the treated upholstery material distinguishes the seat from an person wearing black clothing, while another set of areas of untreated upholstery material distinguishes the seat from an person wearing gray clothing. Alternatively, a pattern of horizontal and vertical stripes as shown in FIG. 4 or a checkerboard pattern provide such distinction in two dimensions. Obviously, other patterns can be utilized within the context of the present invention.

Another approach to provide distinction between different black objects in an electronic image is to coat some of the objects with a near infrared reflective coating containing microscopic glass spheres, instead of a pigment. Plain glass spheres, such as "T-4" spheres available from Potters Industries of Valley Forge, Pa., USA, or glass spheres with one hemisphere coated with metal, such as "145 Type A Metalized Glass Spheres" manufactured by 3M Corporation of St. Paul, Minn., USA, can be used. These spheres may be disbursed in an acrylic matrix, such as "Minwax Ultrafast Drying Polyacrylic Protective Finish" which is an acrylic lacquer sold by the Minwax Company. Another matrix can be formed by dissolving 150 grams of "IR6" acrylic-based NIR transmitting filter material available from Fresnel Technologies, Inc., of Fort Worth, Tex., USA in 560 grams of chloroform.

The resultant solution is applied to the vinyl or other upholstery material within the motor vehicle by a conventional process. The surfaces of the spheres are highly reflective to the near infrared light and provide an noticeably shinier and brighter appearance to the surfaces that have been treated than untreated surfaces. As with the previously describe reflective substances, the interior of the motor vehicle may be coated in a pattern so as to be distinguishable from clothing worn by an occupant of the motor vehicle seat.

The coatings utilizing glass spheres have exhibited a tendency to wear off due to abrasion from people sliding onto and off the motor vehicle seat. Thus, it may be preferable to utilize the first type of reflective coatings described above on motor vehicle surfaces that are subjected to abrasion. However, the glass bead substances can be applied to other surfaces in the motor vehicle, such as the door panels and the headliner, which are less subject to abrasion. Such coatings distinguish these surfaces from those of the seat, thereby enabling the image analysis to determine the position of a movable seat within the motor vehicle.

Furthermore, the orientation of the camera 24 within the motor vehicle may change due to vibration and contact by the occupants. Such movement of the camera with respect to the motor vehicle alters the image produced by the camera and specifically the relative positions of otherwise fixed objects with in the image, such as the steering wheel and doors. If the image analysis is based on a comparison of the position of objects between two or more images acquired at different points in time, such movement of the camera undermines that analysis. By placing markers in the motor vehicle that can easily be discerned in the electronic images, such as by coating specific components of the vehicle interior with one of the previously described NIR reflective substances, the shift of those components in the images due to camera movement can be easily ascertained. Foe example, the pillar between the doors on each side of an automobile and the pillar between the rear door and the rear window can be marked with an NIR reflective substance to provide position references in the vehicle.

Thus, the application of the infrared reflective coatings to objects of the interior of a motor vehicle provides a mechanism by which those objects can be distinguished from other objects in an electronic image without effecting the appearance of the vehicle interior to the human eye.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What claimed is:

1. A method for enabling an infrared video image processing system in a motor vehicle to distinguish between objects, said method comprising coating an object with a substance that increases reflectivity of the object to infrared radiation whereby the brightness of the object in an infrared image is changed, the substance contains a pigment in a carrier selected from the group consisting of vinyl printing ink, acrylic lacquer, polyurethane, and polyurethane lacquer, and wherein the substance does not substantially alter reflectivity of the object to visible light.

2. The method as recited in claim 1 wherein the substance is applied in a predefined pattern to the object.

3. The method as recited in claim 1 wherein the substance comprises beads dispersed in a solution selected from the group consisting of an acrylic lacquer and an acrylate dissolved in chloroform.

4. A method for enabling an infrared video image processing system in a motor vehicle to distinguish between objects, said method comprising coating an object with a substance that increases reflectivity of the object to infrared radiation whereby the brightness of the object in an infrared image is changed, the substance contains beads which are reflective to infrared radiation, and wherein the substance does not substantially alter reflectivity of the object to visible light.

5. The method as recited in claim 4 wherein the beads are made of glass.

6. The method as recited in claim 4 wherein the beads are coated with a metal.

7. A method by which an video image system in a motor vehicle distinguishes between first and second objects having similar reflectivity to infrared radiation, said method comprising:
   applying a substance to the first object in the motor vehicle wherein the substance alters reflectivity of the first object to infrared radiation and is imperceptible to a human eye;
   producing an electronic image in response to infrared radiation reflected by the first and second objects; and
   distinguishing between the first and second objects in the electronic image based on the relative brightness of parts of the electronic image.

8. The method as recited in claim 7 wherein the substance is applied in a predefined pattern to the object.

9. The method as recited in claim 7 wherein the substance contains a pigment which appears to the human eye as having substantially the same color as the first object prior to application of the substance.

10. The method as recited in claim 7 wherein the substance contains a pigment in a carrier selected from the group consisting of printing ink, acrylic lacquer, polyurethane, and polyurethane lacquer.

11. The method as recited in claim 7 wherein the substance contains beads which are reflective to infrared radiation.

12. The method as recited in claim 11 wherein the beads are made of glass.

13. The method as recited in claim 11 wherein the beads are coated with a metal.

14. The method as recited in claim 7 wherein the substance comprises beads dispersed in a solution selected from the group consisting of an acrylic lacquer and an acrylate dissolved in chloroform.

* * * * *